United States Patent
Bates et al.

(10) Patent No.: US 6,804,510 B1
(45) Date of Patent: Oct. 12, 2004

(54) SELECTION OF ALTERNATE SOURCES FOR AUDIO BROADCAST SIGNALS RESPONSIVE TO EMBEDDED SOURCE IDENTIFICATION INFORMATION

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,172

(22) Filed: May 24, 2000

(51) Int. Cl.[7] .............................................. H04M 3/42
(52) U.S. Cl. ................ 455/414.4; 455/3.01; 455/179.1; 455/154.1
(58) Field of Search ........................... 455/186.1, 422, 455/426, 550, 575, 552, 422.1, 426.1, 426.2, 550.1, 575.1, 575.7, 552.1, 3.01, 3.02, 3.03, 3.06, 2.01, 414.1, 414.2, 414.3, 414.4, 425, 427, 556.1, 556.2, 466, 179.1, 154.1

(56) References Cited

U.S. PATENT DOCUMENTS

| | | | | |
|---|---|---|---|---|
| 5,390,214 A | * | 2/1995 | Hopkins et al. | 375/259 |
| 5,852,610 A | * | 12/1998 | Olaniyan | 370/486 |
| 5,987,029 A | * | 11/1999 | Kotani et al. | 370/389 |
| 6,289,207 B1 | * | 9/2001 | Hudecek et al. | 455/150.1 |
| 6,314,094 B1 | * | 11/2001 | Boys | 370/352 |
| 6,349,329 B1 | * | 2/2002 | Mackintosh et al. | 709/219 |
| 6,389,463 B2 | * | 5/2002 | Bolas et al. | 709/219 |
| 6,411,800 B1 | * | 6/2002 | Emerson, III | 455/186.1 |
| 6,539,210 B1 | * | 3/2003 | Heredia et al. | 455/154.1 |
| 6,618,585 B1 | * | 9/2003 | Robinson | 455/3.02 |

* cited by examiner

*Primary Examiner*—Nay Maung
*Assistant Examiner*—Tanmay Lele
(74) *Attorney, Agent, or Firm*—Wood, Herron & Evans (57) ABSTRACT

An apparatus, program product, and method utilize embedded source identity information within an audio broadcast signal to facilitate the reception of the audio broadcast signal from an alternate source. Such embedded information may be used, for example, to facilitate the automated selection of an alternate source of an audio broadcast signal, e.g., in response to poor reception of the primary source of the audio broadcast signal, so that a listener is less likely to miss any portion of an audio broadcast. In one particular implementation, an audio broadcast signal is a radio signal broadcast by a radio station, whereby suitable alternate sources might include another radio station that broadcasts the audio broadcast signal over a different frequency, a transmission device accessible over a telephone network, or a transmission device accessible over a computer network such as the Internet.

23 Claims, 3 Drawing Sheets

SELECTION OF ALTERNATE SOURCES FOR AUDIO BROADCAST SIGNALS RESPONSIVE TO EMBEDDED SOURCE IDENTIFICATION INFORMATION

FIELD OF THE INVENTION

The invention is generally related to the transmission and reception of audio broadcasts, e.g., from radio stations and the like.

BACKGROUND OF THE INVENTION

Radio has been an important part of our culture for many years. Despite competition from relatively newer broadcast media such as television and the Internet, many people still find radio to be an important source of news, information, and entertainment. Radio has also significantly advanced since the days of analog AM and FM broadcasts. For example, radio broadcasts are now capable of being broadcast in a digital format, typically using a packet-based communication medium, and often providing better sound quality than with older analog technologies. Digital radio broadcasts are also capable of transmitting additional information to listeners, e.g., station call letters, program information, etc.

One continually strong market for radio stations has been listeners in automobiles, particularly due to the fact that visual information available from television and the Internet is not compatible with keeping one's eyes on the road. Mobile radio receivers commonly known as car radios or car stereos have long been provided as standard equipment in automobiles and other vehicles.

Mobile radio receivers have always suffered from the problem of varying signal strengths of audio broadcast signals such as radio broadcasts. Radio stations are capable of transmitting over only a certain geographical area, so the farther a receiver gets from a radio transmitter, the weaker the signal, and the poorer the reception by the receiver. Topographical factors such as buildings, tunnels, mountains, etc. can also affect signal strength. Thus, as a listener of a particular radio station rides along in an automobile, it is not uncommon for the reception of the audio broadcast signal to continually increase and decrease in quality. Furthermore, for travelers that are merely passing through a geographical area, such travelers will often eventually lose reception as they get farther away from the radio station.

More often than not, the signal strength of an audio broadcast signal will weaken at the most inopportune times, such as the last inning of a baseball game, during a news conference, during a breaking weather report, during a heated discussion on talk radio, etc. Missing out on an interesting broadcast can be significantly frustrating to listeners, so the risk of losing reception of an audio broadcast signal has always been considered to be a significant drawback of radio.

Outside of the knowledge of many listeners, however, is the fact that alternate sources of an audio broadcast signal may exist. For example, FCC regulations often limit the transmission power of radio stations in certain areas, requiring that radio stations broadcast over multiple carrier frequencies from geographically dispersed transmitters to adequately cover a particular listening area. In addition, many audio broadcast signals are now available on the Internet, and are capable of being accessed by suitable streaming programs executed by computers.

When a listener is unaware of an alternate source of an audio broadcast signal, the listener is required to suffer through poor reception (if analog) or intermittent reception (if digital), or to manually search for other radio stations that may contain the desired information. And even if a listener is aware of a particular alternate source for an audio broadcast signal, the user is still required to manually interact with a radio receiver to select the alternate source.

Therefore, a significant need continues to exist in the art for a manner of alleviating the frustration associated with weak or lost reception of audio broadcast signals. In particular, a significant need continues to exist for a manner of facilitating the identification and reception of audio broadcast signals from alternate sources.

SUMMARY OF THE INVENTION

The invention addresses these and other problems associated with the prior art by providing an apparatus, program product, and method that utilize embedded source identity information within an audio broadcast signal to facilitate the reception of the audio broadcast signal from an alternate source. While the invention has a multitude of other uses that will become more apparent below, embedded source identity information may be used to facilitate the automated selection of an alternate source, e.g., in response to poor reception of the primary source of the audio broadcast signal, so that a listener is less likely to miss interesting portions of an audio broadcast.

Any number of different types of alternate sources may be identified by embedded source identity information consistent with the invention. For example, particularly where the audio broadcast signal is a radio broadcast from a radio station, embedded source identity information may identify another radio station that broadcasts the audio broadcast signal over a different frequency. Embedded source identity information may also be used to identify a telephone number that a listener may call to continue listening to the audio broadcast. Furthermore, embedded source identity information may be used to identify a network address (e.g., a URL) that a listener may be connected to over a computer network. It will be appreciated by those of ordinary skill in the art having the benefit of the instant disclosure that other alternate sources may be identified by embedded source identity information, and thus the invention is not limited to the particular types of alternate sources described herein.

It will also be appreciated that both the reception and the transmission of an audio broadcast may accommodate the use of embedded source identity information consistent with the invention.

From the standpoint of reception, an audio broadcast may be received in a manner consistent with the invention by receiving an audio broadcast signal from a first source, detecting a source identifier in the audio broadcast signal that identifies an alternate source for the audio broadcast signal, and receiving the audio broadcast signal from the alternate source identified by the source identifier. From the standpoint of transmission, an audio signal may be transmitted in a manner consistent with the invention by embedding a source identifier within an audio signal, and broadcasting the audio signal with the source identifier embedded therein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The discussion hereinafter will focus on a specific implementation of the invention in the field of digital radio broadcasting, where an audio broadcast signal is transmitted in the form of a digital data stream incorporating streamed data packets carrying audio information representative of an audio broadcast. Consistent with the invention, one or more alternate sources of an audio broadcast are identified within the digital data stream through the use of source identity packets embedded periodically within the digital data stream. However, it will be appreciated by one of ordinary skill in the art having the benefit of the instant disclosure that certain aspects of the invention will have applicability in other applications where audio signals may be broadcasted, e.g., analog radio broadcasts, etc. Thus, the invention is not limited to the specific implementations discussed herein.

Figure 1:
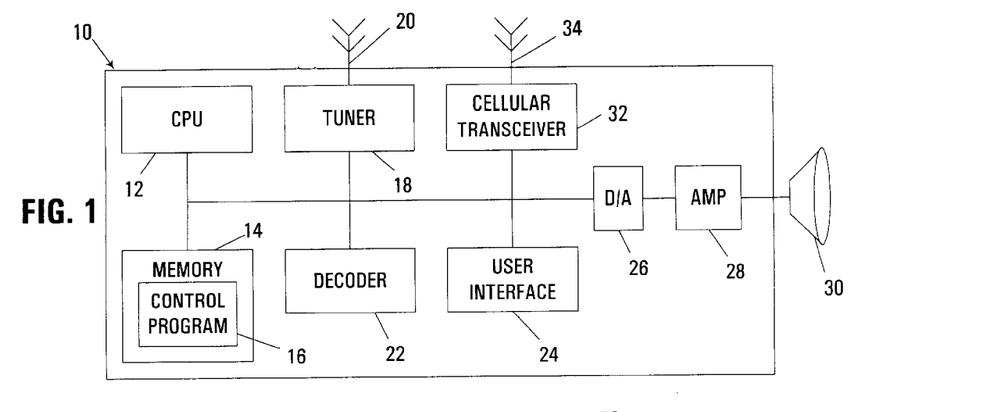
FIG. 1 is a block diagram of a digital radio receiver consistent with the invention.

Turning now to the Drawings, wherein like numbers denote like parts throughout the several views, FIG. 1 illustrates a specific implementation of the invention in a digital radio receiver 10, e.g., suitable for use in a mobile application (as with a car stereo) or a stationary application (as with a home stereo). Receiver 10 includes a central processing unit (CPU) 12 interfaced with a memory 14, within which resides a control program 16 that is executed by the CPU to implement the functionality described herein, as well as other functionality of a digital radio receiver as is known in the art. In this context, CPU 12, memory 14, and control program 16 function as a controller for the digital radio receiver. In other environments, however, hardwired logic may be used in lieu of a stored program and processor, and thus, the invention is not limited to the particular implementation described herein.

Receiver 10 may be implemented using practically any type of computer, computer system or other programmable electronic device. The CPU 12 thereof may include one or more processors (e.g., microprocessors or microcontrollers), and the memory may represent volatile or non-volatile solid state memories, magnetic storage media, optical storage media, or combinations of the same, as well as any supplemental levels of memory, e.g., cache memories, backup memories (e.g., programmable or flash memories), read-only memories, etc. In addition, the memory may be considered to include memory storage physically located elsewhere in a digital processing system, e.g., any cache memory in a processor, as well as any storage capacity used as a virtual memory, e.g., as stored on a mass storage device or on another device coupled over a network interconnection.

Receiver 10 typically operates under the control of an operating system, and executes various computer software applications, components, programs, objects, modules, etc. (e.g., control program 16, among others). Moreover, various applications, components, programs, objects, modules, etc. may also execute on one or more processors in another computer or other device coupled to such receiver via networked interconnections, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs". The computer programs typically comprise instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links. Over-the-air digital packets are received by a tuner 18 coupled to an antenna 20, and are decoded by a decoder 22. Interaction with a user is supported via a user interface 24, which may include both a display panel for displaying information to a user as well as one or more buttons for receiving input from a user. Audio data packets decoded by decoder 22 are converted into an analog format by a digital-to-analog analog (D/A) converter 26, with the analog output of converter 26 fed to an amplifier 28 that drives one or more loudspeakers 30. It will be appreciated that the reception and decoding of digital data packets, the generation and emission of an audible signal based upon the information within such packets, and the interaction with a user are all well understood functions implemented by digital radio receivers.

An additional broadcast reception device, e.g., a cellular transceiver 32, may also be utilized in receiver 10 to support the reception of an audio broadcast signal from an alternate source. Cellular transceiver 32 permits receiver 10 to communicate over a cellular or other form of wireless network, and as such incorporates much of the functionality of a cellular telephone. In some implementations, cellular transceiver 32 may be implemented external from receiver 10, e.g., so that an existing cellular device such as a hard-wired automobile cellular telephone or a handheld cellular telephone, which is regularly used for normal cellular communications, may also be used to receive audio broadcasts when not being used for normal cellular communications.

Other broadcast reception devices may be incorporated into receiver 10 consistent with the invention, e.g., additional digital radio tuners, modems, wired telephone network interfaces, wireless Internet transceivers, etc.

Moreover, in some implementations no additional broadcast reception device may be used.

Figure 2:
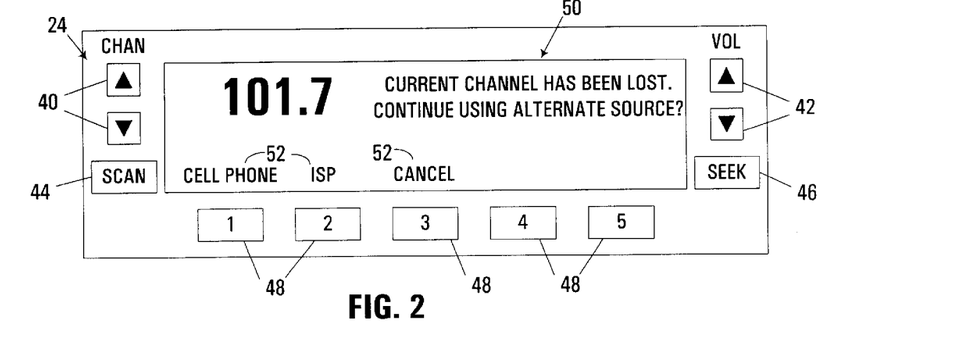
FIG. 2 illustrates an exemplary display panel for the digital radio receiver of FIG. 1, with an alternate source selection screen displayed thereon.

FIG. 2 illustrates an exemplary user interface 24, e.g., as may be utilized in a mobile radio receiver for use in cars, trucks and other vehicles. User interface 24 is implemented specifically as a face plate control panel including a plurality of buttons 40–48 for use in receiving user input and a display 50 capable of displaying information to a user. User interface 24 includes a number of conventional radio buttons, including tuning buttons 40, volume buttons 42, scan button 44, seek button 46 and channel select buttons 48, the use and configuration of which are well known in the art.

In the illustrated implementation, the channel select buttons 48 are also utilized as soft-keys to access various menu options displayed on display 50. The current soft-key functions assigned to these buttons are represented by labels 52 displayed in proximity with the associated buttons 48.

Display 50 may be implemented using any of a number of known display technologies, including, for example, LCD's, LED's, etc. Moreover, it will be appreciated that a wide variety of alternate user interfaces may be used in the alternative. For example, display 50 may incorporate a touch screen to permit direct user input to the display. In other applications, alternate computer or other electronic device interfaces may be used, including keyboards, pointing devices, video displays, etc., as appropriate for the particular type of application within which the receiver is being used. The invention is therefore not limited to the particular user interface disclosed herein.

Figure 3:
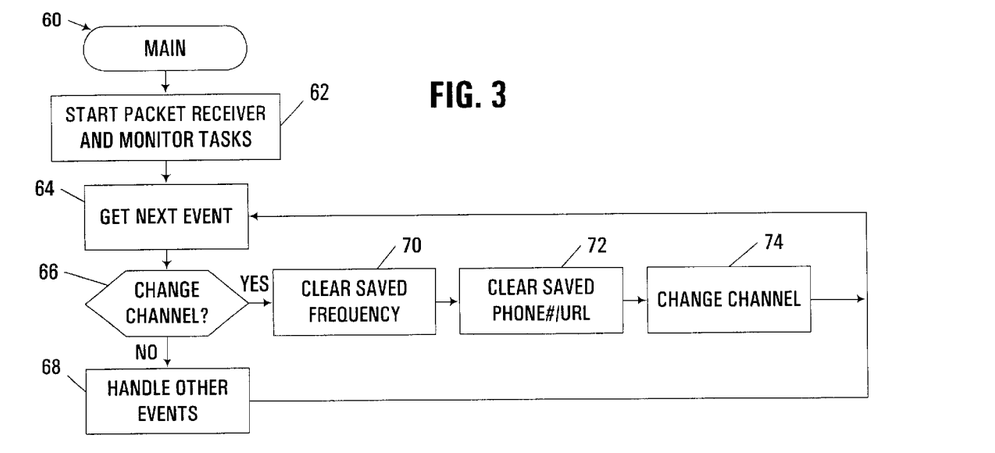
FIG. 3 is a flowchart illustrating the program flow of a main routine executed by the digital radio receiver of FIG. 1.

FIG. 3 illustrates a main routine 60 executed by control program 16 of FIG. 1. Routine 60 begins in block 62 by starting packet receiver and monitor tasks to perform various background functions for the receiver. In particular, the packet receiver task (described in connection with FIG. 4 below) processes incoming packets from a digital radio broadcast data stream received by tuner 18 and decoded by decoder 22 (FIG. 1). The monitor task (described in connection with FIGS. 5 and 6 below) implements automated selection of an alternate source responsive to the detected signal strength of a digital radio broadcast received from a primary source.

Returning to FIG. 3, control next passes to block 64 to initiate an event-driven loop to process events generated by the receiver. One such event capable of being passed to routine 60 is a change channel event, which may be generated for example in response to user input to tune to a different channel, to user input requesting a seek or scan function, to user input directed to a stored channel button, etc., and which is detected in block 66. Other events, the details of which are not relevant to an understanding of the invention, are handled in a conventional manner as shown in block 68.

In the illustrated implementation, up to three possible alternate sources of an audio broadcast signal are supported for any given audio broadcast signal. First, an alternate source may be another carrier frequency, i.e., a different channel on the same or a different radio band (e.g., AM, FM, digital, etc.). The alternate source may be co-owned with, or separately owned from, the primary radio station. A separately owned radio station might be considered a suitable an alternate source, for example, if the radio station was broadcasting a syndicated program such as a talk show or sports broadcast that is provided to multiple radio stations.

Second, an alternate source may be a transmitter accessible via a wired or wireless telephone network. The transmitted information may be an audible signal, such that a listener is capable of listening to a broadcast simply by connecting to the transmitter using the cellular transceiver and amplifying the received information. In the alternative, the transmitted information may be non-audible information such as digital packets, which could be received and decoded in much the same manner as a radio broadcast.

Third, an alternate source may be a server accessible over a computer network such as the Internet. The transmitted information may conform to any number of known streaming protocols, among other formats. Moreover, the alternate source may be accessible by receiver 10 via a dedicated receiver or tuner, or may be accessible via an intermediate Internet Service Provider (ISP) or like party that is capable of interfacing the cellular network with the computer network, so that cellular transceiver 32 (FIG. 1) is also capable of connecting to a computer network source.

It will be appreciated that any combination of the above alternate sources may be used in different embodiments. Moreover, other forms of alternate sources of an audio broadcast signal will be apparent to one of ordinary skill in the art having the benefit of the instant disclosure.

Returning to FIG. 3, based upon the above alternate source types, and in response to a change channel event, block 66 passes control to blocks 70–72 to clear several variables associated with the possible types of alternate sources accessible by the receiver. Block 70 clears a saved frequency variable that stores an alternate carrier frequency for a given audio broadcast signal. Block 72 clears a saved phone number and/or a saved Uniform Resource Locator (URL) representative of a network address through which a computer networked source may be accessed.

Block 74 next performs a channel change operation to control the tuner to tune to a carrier frequency for a selected channel, an operation that is well understood in the art. Upon completion of block 74, control returns to block 64 to process additional events.

Figure 4:
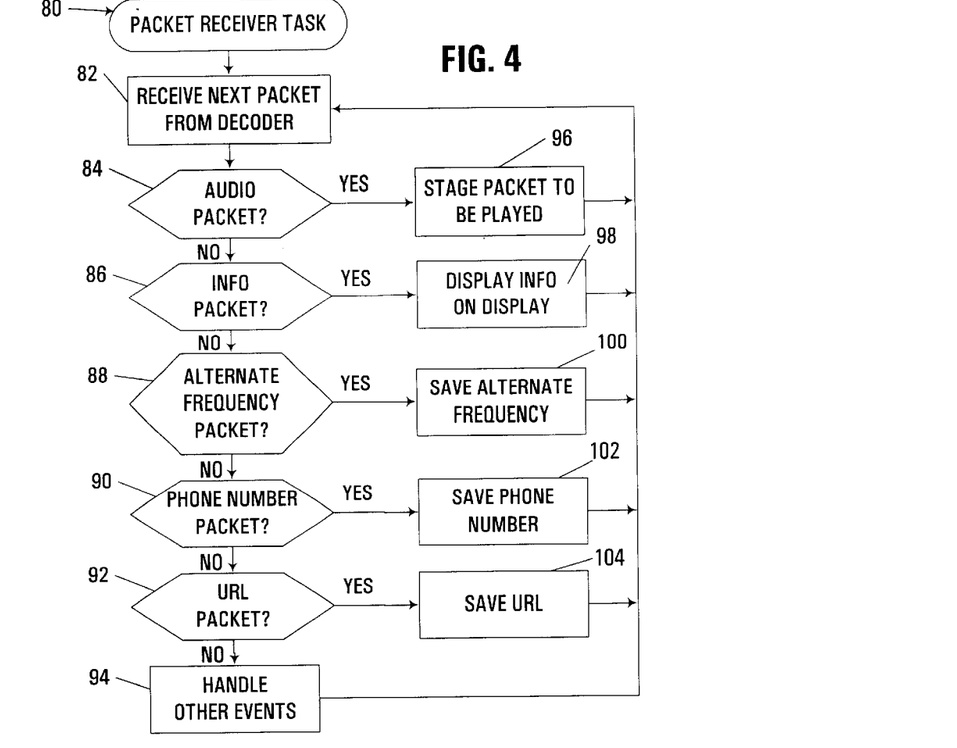
FIG. 4 is a flowchart illustrating the program flow of the packet receiver task referenced in FIG. 3.

FIG. 4 illustrates an exemplary implementation of a packet receiver task 80 consistent with the invention. Task 80 begins in block 82 by initiating an event-driven loop that waits for digital packets from the decoder, and for each such packet, passes control to a sequence of blocks 82–92 to handle the received packets in an appropriate manner. Block 94 detects and handles other types of packets (if any) capable of being provided in the audio broadcast signal, but which are not relevant to an understanding of the invention.

Block 84, for example, detects an audio packet, which is the packet type that includes the audio data representative of the audio broadcast signal. For each such packet, control passes to block 96 to stage the packet to be played over the speakers, in a manner well known in the art.

For information packets, which contain display information such as station call letters, program information, emergency information, etc., block 86 handles such packets by passing control to block 98 to initiate display of the included information on the display panel.

Blocks 88, 90 and 92 respectively detect three variations of a source identity packet—that is, the source identity information used to identify an alternate source associated with a particular audio broadcast signal. Block 88, for example, detects an alternate frequency packet, and passes control to block 100 to save the alternate frequency provided in such a packet in the saved frequency variable. Block 90 detects a phone number packet, and passes control to block 102 to save the telephone number included in such a packet in the saved phone number variable. Block 92 detects a URL packet, and passes control to block 104 to save the URL included in such a packet in the saved URL variable.

It will be appreciated that other types of packets may be provided in an audio broadcast signal to identify other types of alternate sources. Moreover, data formats other than packets may be used to transmit source identifying information consistent with the invention.

Figure 5:
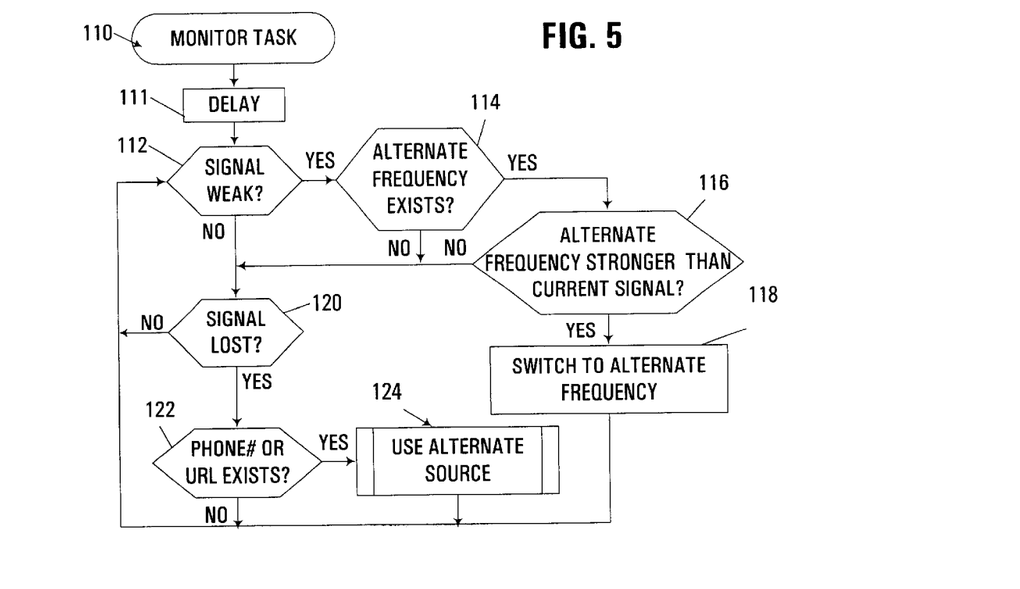
FIG. 5 is a flowchart illustrating the program flow of the monitor task referenced in FIG. 3.

FIG. 5 illustrates an exemplary implementation of a monitor task 110 consistent with the invention. Task 110 begins in block 111 by pausing for a delay. Block 112 then determines whether the primary audio broadcast signal received by tuner 18 is "weak", e.g., whether the signal strength of the audio broadcast signal falls below a certain threshold, thus signifying that the reception of the signal is poor. If so, control passes to block 114 to determine whether an alternate carrier frequency exists, i.e., whether a value is stored in the saved frequency variable. If so, control passes to block 116 to determine whether the audio broadcast signal provided at the alternate frequency is stronger than the current signal (e.g., by briefly tuning tuner 18 to the alternate frequency). If so, control passes to block 118 to tune the tuner to the alternate frequency, thereby automatically selecting the alternate source. Control then returns to block 111 to wait for a next monitoring cycle.

Returning to blocks 114 and 116, if either no alternate frequency exists, or if the signal at the alternate frequency is not stronger than the current (primary) signal, control passes to block 120. Also, returning to block 112, if the signal is not determined to be weak, control likewise passes to block 120.

Block 120 determines whether the signal has been altogether lost, e.g., whether the signal strength has fallen below another threshold that is even lower than that tested in block 112. If so, control passes to block 122. Otherwise, control returns to block 111.

Block 122 next determines whether a phone number and/or URL exists, i.e., whether values are stored in the saved phone number and saved URL variables. If either or both exist, control passes to call a use alternate source routine 124. Control then returns to block 111.

Figures 6, 7:
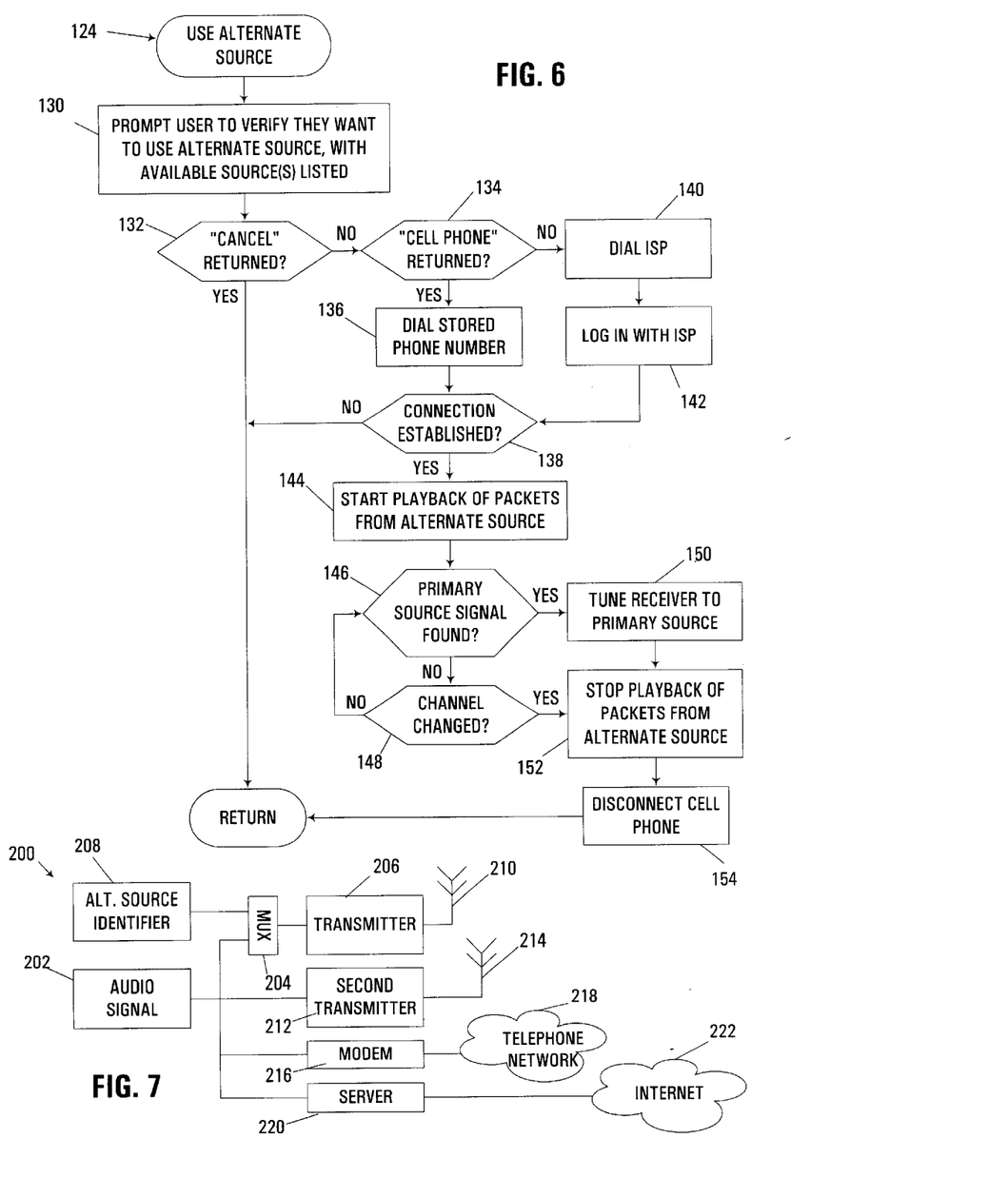
FIG. 6 is a flowchart illustrating the program flow of the use alternate source routine referenced in FIG. 5.
FIG. 7 is a block diagram of a digital radio transmission system consistent with the invention.

FIG. 6 illustrates use alternate source routine 124 in greater detail. Routine 124 begins in block 130 by prompting the user to verify whether an alternate source should be activated. Included within block 130 is listing any and all available alternate sources (e.g., by checking each of the saved phone number and saved URL variables). FIG. 2, for example, illustrates a suitable prompt on display 50 when both a phone number and a URL are available.

It is to be noted that soft-key functions are supported for selecting "cell phone", "ISP", or "cancel" in response to the prompt. As such, in response to a user selection of one of the soft-key functions, control passes from block 130 to block 132 to decode the returned selection. If a "cancel" option is selected, block 132 terminates routine 124 without selecting an alternate source. Otherwise, control passes to block 134 to determine whether "cell phone" was returned. If so, control passes to block 136 to dial the stored telephone number, and then to block 138 to determine whether a connection was established.

Returning to block 134, if "cell phone" was not returned (indicating "ISP" was returned), control passes to block 140 to dial an ISP telephone number (which is typically previously stored in the receiver) to connect the receiver to an ISP for connection to the Internet. Block 142 then logs in to the ISP, typically providing a user name and password as is well known in the art (also typically stored in the receiver). Control then passes to block 138 to verify whether a successful connection was made. In the alternative, rather than dialing an ISP to connect to the Internet, a persistent Internet connection may be supported, whereby blocks 140 and 142 may be omitted from routine 124.

If a connection cannot be established, block 138 terminates routine 124 without selecting an alternate source. In addition, an error message may be displayed. If, however, a connection is established, control passes to block 144 to begin playback of audio packets from the alternate source, including any decoding or formatting required to playback the audio broadcast signal from the alternate source on the receiver's speakers. In addition, for an Internet source, a request to access the specified URL is also forwarded over the computer network to initiate streaming of the audio broadcast signal.

Control then passes to enter a monitoring loop including blocks 146 and 148. Block 146 determines whether a sufficient signal from the primary source has again been reacquired, e.g., by periodically monitoring the single strength for the tuner when tuned to the frequency for the primary source of the audio broadcast signal. A threshold signal strength may need to be exceeded for a predetermined amount of time to trigger block 146, although other manners of determining that a signal has been reacquired may be used in the alternative.

If the primary signal has been reacquired, control passes to block 150 to tune the receiver to the primary source, then to block 152 to halt playback of the audio packets from the alternate source. Next block 154 terminates the connection to the alternate source, and routine 124 is complete.

Block 148 determines whether the current channel has been changed, indicating that a different audio broadcast signal is to be played back to the user. If so, control passes to block 152 to stop playback of the alternate source, and then to block 154 to terminate the connection to the alternate source. Routine 124 is then complete.

FIG. 7 illustrates an exemplary digital radio transmission system 200 suitable to broadcasting an audio broadcast signal with embedded source identifying information as disclosed herein. System 200 includes a digital audio signal source 202 coupled via a multiplexer 204 to a transmitter 206. Also coupled to multiplexer 204 is alternate source identifying information source 208, and responsive to a select signal generated by a controller (not shown), digital packets from one of the digital audio signal source 202 and the information source 208 is fed to the transmitter for broadcast on an antenna 210. The controller typically operates to periodically embed one or more different source identifying packets into the digital data stream represented by the digital audio broadcast signal output by source 202.

One or more alternate sources for the digital audio signal are shown in FIG. 7, including a second transmitter 212 configured to broadcast the digital audio signal over a different carrier frequency than transmitter 206 (typically via a geographically-dispersed antenna 214), a modem 216 configured to interface with compatible receivers over a telephone network 218 (which may include wired and/or wireless telephone networks), and a server 220 configured to interface with compatible receivers over the Internet 222 or other computer network. Any of the aforementioned alternate sources may be omitted from a digital radio transmission system consistent with the invention, and one or more alternate sources may be controlled by third parties, rather than being provided within an integrated system. Furthermore, it will be appreciated that while each alternate source generally broadcasts the same audio broadcast signal, the broadcast by each source may be delayed relative to other sources. Moreover, for the telephone network, rather than a modem, a transmitter capable of decoding and generating an audible signal from the audio broadcast signal may be used, such that the actual unencoded audio signal is received by the cellular transceiver of a compatible receiver.

Various modifications may be made to the illustrated embodiments without departing from the spirit and scope of the invention. For example, FIG. 5 illustrates automated (without prompting) switching between a primary source and an alternate frequency source, and partially-automated (with prompting) switching between a primary source and a non-radio alternate source. In other embodiments, however, prompts may selectively be used or omitted for different types of alternate sources.

Moreover, FIG. 5 illustrates an implementation whereby alternate frequency sources are prioritized relative to non-radio sources, by virtue of the separate signal strength thresholds tested by the monitoring task. In other embodiments, however, different relative priorities may be assigned to different alternate sources, and more than one alternate source may share the same relative priority.

It will also be appreciated that source switching need not be performed relative to signal strength determinations. Rather, purely manual selection of alternate sources may be desirable in some embodiments.

Other modifications will become apparent to one of ordinary skill in the art. Therefore, the invention lies in the claims hereinafter appended.

What is claimed is:

1. A method of receiving an audio broadcast, the method comprising:
   receiving an audio broadcast signal from a first source, wherein the audio broadcast signal comprises a radio broadcast signal from a radio station;
   detecting a source identifier in the audio broadcast signal that identifies an alternate source for the audio broadcast signal, wherein the alternate source transmits the audio broadcast signal via a medium other than a radio broadcast signal;
   receiving the audio broadcast signal from the alternate source identified by the source identifier;
   detecting weak reception of the audio broadcast signal from the first source, wherein receiving the audio broadcast signal from the alternate source is performed responsive to detecting the weak reception;
   detecting strong reception of the audio broadcast signal from the first source during reception of the audio broadcast signal from the alternate source; and
   discontinuing reception of the audio broadcast signal from the alternate source responsive to detecting the strong reception.

2. The method of claim 1, wherein the audio broadcast signal from the first source comprises a digital radio data stream.

3. The method of claim 2, wherein the source identifier comprises a telephone number, and wherein receiving the audio broadcast signal from the alternate source comprises:
   dialing the telephone number on a cellular network; and
   receiving the audio broadcast signal over the cellular network.

4. The method of claim 2, wherein the source identifier comprises a network address identifier that identifies a storage location on a computer network that broadcasts the audio broadcast signal, and wherein receiving the audio broadcast signal from the alternate source comprises connecting to the storage location on the computer network to receive the audio broadcast signal.

5. The method of claim 4, wherein the network address identifier comprises a Uniform Resource Locator (URL), and wherein receiving the audio broadcast signal from the alternate source further comprises:
   dialing a telephone number of an Internet Service Provider (ISP) on a cellular network; and
   sending the URL to the ISP over the cellular network.

6. The method of claim 1, wherein receiving the audio broadcast signal from the first source and receiving the audio broadcast signal from the alternate source each include receiving the audio broadcast signal over a wireless medium.

7. A method of receiving an audio broadcast, the method comprising:
   receiving an audio broadcast signal from a first source, wherein the audio broadcast signal comprises a radio broadcast signal from a radio station;
   detecting a source identifier in the audio broadcast signal that identifies an alternate source for the audio broadcast signal, wherein the alternate source transmits the audio broadcast signal via a medium other than a radio broadcast signal; and
   receiving the audio broadcast signal from the alternate source identified by the source identifier;
   wherein the audio broadcast signal from the first source comprises a digital radio data stream, wherein the digital radio data stream from the first source is transmitted over a first carrier frequency, wherein the audio broadcast signal from the first source includes a second source identifier, wherein the second source identifier comprises a frequency identifier that identifies a second carrier frequency associated with a second alternate source, the method further comprising retuning a digital radio receiver from the first carrier frequency to the second carrier frequency.

8. The method of claim 7, further comprising detecting weak reception of the audio broadcast signal from the first source, wherein receiving the audio broadcast signal from the alternate source is performed responsive to detecting the weak reception.

9. A method of receiving an audio broadcast, the method comprising:
   receiving an audio broadcast signal from a first source, wherein the audio broadcast signal comprises a radio broadcast signal from a radio station;
   detecting a source identifier in the audio broadcast signal that identifies an alternate source for the audio broadcast signal, wherein the alternate source transmits the audio broadcast signal via a medium other than a radio broadcast signal;
   receiving the audio broadcast signal from the alternate source identified by the source identifier;
   detecting weak reception of the audio broadcast signal from the first source, wherein receiving the audio broadcast signal from the alternate source is performed responsive to detecting the weak reception, wherein detecting weak reception further comprises detecting lost reception of the audio broadcast signal from the first source;
   detecting a second source identifier in the audio broadcast signal that identifies a second alternate source for the audio broadcast signal; and
   receiving the audio broadcast signal from the second alternate source identified by the second source identifier responsive to detecting the lost reception.

10. An apparatus, comprising:
a receiver configured to receive an audio broadcast signal from a first source, wherein the audio broadcast signal comprises a radio broadcast signal from a radio station; and
a controller coupled to the receiver and configured to detect a source identifier in the audio broadcast signal that identifies an alternate source for the audio broadcast signal, the controller further configured to initiate reception of the audio broadcast signal from the alternate source identified by the source identifier, wherein the alternate source transmits the audio broadcast signal via a medium other than a radio broadcast signal, wherein the controller is further confirmed to detect weak reception of the audio broadcast signal by the receiver, and to initiate reception of the audio broadcast signal from the alternate source responsive to detecting the weak reception, and wherein the controller is further configured to detect lost reception of the audio broadcast signal from the first source, to detect a second source identifier in the audio broadcast signal that identifies a second alternate source for the audio broadcast signal, and to initiate reception of the audio broadcast signal from the second alternate source identified by the second source identifier responsive to detecting the lost reception.

11. The apparatus of claim 10, wherein the receiver comprises a digital radio receiver configured to receive a digital radio data stream from the first source.

12. The apparatus of claim 11, wherein the digital radio data stream from the first source is transmitted over a first carrier frequency, wherein the digital radio receiver is configured to receive the audio broadcast signal from the first source by tuning to the first carrier frequency, wherein the audio broadcast signal from the first source includes a second source identifier, wherein the second source identifier comprises a frequency identifier that identifies a second carrier frequency associated with a second alternate source, and wherein the controller is configured to tune the digital radio receiver to the second carrier frequency.

13. The apparatus of claim 11, further comprising a cellular transceiver coupled to the controller, wherein the source identifier comprises a telephone number, and wherein the controller is configured to initiate reception of the audio broadcast signal from the alternate source by controlling the cellular transceiver to dial the telephone number on a cellular network, and receiving the audio broadcast signal over the cellular network.

14. The apparatus of claim 11, wherein the source identifier comprises a network address identifier that identifies a storage location on a computer network that broadcasts the audio broadcast signal, and wherein the controller is configured to initiate reception of the audio broadcast signal from the alternate source by connecting to the storage location on the computer network to receive the audio broadcast signal.

15. The apparatus of claim 14, further comprising a cellular transceiver coupled to the controller, wherein the network address identifier comprises a Uniform Resource Locator(URL), and wherein the controller is configured to initiate reception of the audio broadcast signal from the alternate source further by dialing a telephone number of an Internet Service Provider (ISP) on a cellular network, and sending the URL to the ISP over the cellular network.

16. The apparatus of claim 10, wherein the controller is further configured to detect strong reception of the audio broadcast signal from the first source during reception of the audio broadcast signal from the alternate source, and to discontinue reception of the audio broadcast signal from the alternate source responsive to detecting the strong reception.

17. A program product, comprising:
a program for a controller coupled to a receiver capable of receiving an audio broadcast signal from a first source, wherein the audio broadcast signal comprises a radio broadcast signal from a radio station, the program configured to detect a source identifier in the audio broadcast signal that identifies an alternate source for the audio broadcast signal, and to initiate reception of the audio broadcast signal from the alternate source identified by the source identifier, wherein the alternate source transmits the audio broadcast signal via a medium other than a radio broadcast signal, wherein the program is further configured to detect weak reception of the audio broadcast signal by the receiver, and to initiate reception of the audio broadcast signal from the alternate source responsive to detecting the weak reception, and wherein the program is further configured to detect strong reception of the audio broadcast signal from the first source during reception of the audio broadcast signal from the alternate source, and to discontinue reception of the audio broadcast signal from the alternate source responsive to detecting the strong reception; and
a computer readable signal bearing medium bearing the program.

18. A method of transmitting an audio signal, the method comprising:
embedding a first source identifier within an audio signal, wherein the audio signal comprises a radio broadcast signal the first source identifier identifying an alternate source for the audio signal, wherein the alternate source transmits the audio signal via a medium other than a radio broadcast signal;
broadcasting the audio signal with the first source identifier embedded therein, wherein the audio signal comprises a digital radio data stream, and wherein the first source identifier comprises a packet embedded within the digital radio data stream, wherein broadcasting the audio signal comprises broadcasting the audio signal over a first carrier frequency;
embedding a second source identifier within the audio signal, wherein the second source identifier comprises a frequency identifier that identifies a second carrier frequency associated with a second alternate source; and
broadcasting the audio signal over the second carrier frequency.

19. The method of claim 18, wherein the first source identifier comprises a telephone number, the method further comprising transmitting the audio signal over a telephone network.

20. The method of claim 18, wherein the first source identifier comprises a network address identifier that identifies a storage location on a computer network, the method further comprising transmitting the audio signal over the computer network.

21. An apparatus, comprising:
a controller configured to embed a first source identifier within an audio signal, the audio signal comprising a radio broadcast signal, the first source identifier identifying an alternate source for the audio signal, wherein the alternate source transmits the audio signal via a medium other than a radio broadcast signal;

a first transmitter configured to broadcast the audio signal with the first source identifier embedded therein, wherein the first transmitter comprises a digital radio transmitter that transmits the audio signal as a digital radio data stream, and wherein the first source identifier comprises a packet embedded within the digital radio data stream, wherein the first transmitter is configured to broadcast the audio signal over a first carrier frequency, wherein the controller is configured to embed a second source identifier within the audio signal, wherein the second source identifier comprises a frequency identifier that identifies a second carrier frequency associated with a second alternate source; and a second transmitter configured to broadcast the audio signal over the second carrier frequency.

22. The apparatus of claim 21, wherein the first source identifier comprises a telephone number, the apparatus further comprising a modem configured to transmit the audio signal over a telephone network.

23. The apparatus of claim 21, wherein the first source identifier comprises a network address identifier that identifies a storage location on a computer network, the apparatus further comprising a server configured to transmit the audio signal over the computer network.

\* \* \* \* \*